Figure 1:
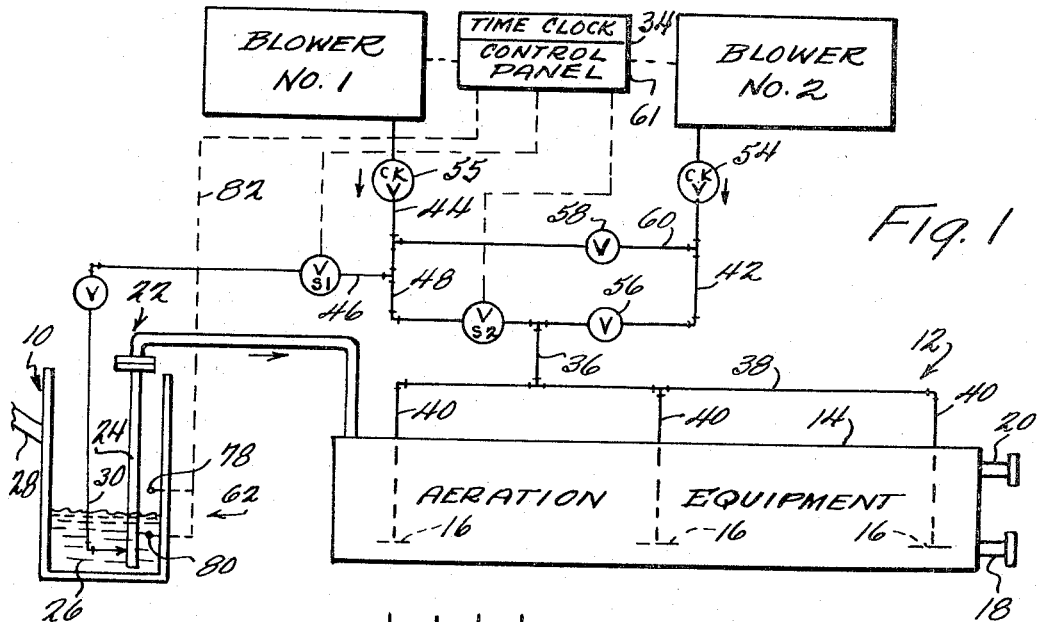

Nov. 28, 1967    R. D. MITCHELL    3,355,019

EDUCTOR CONTROL IN SEWAGE TREATMENT PLANT

Filed Nov. 3, 1965

INVENTOR
RYAN D. MITCHELL

Cushman, Darby & Cushman
ATTORNEYS

United States Patent Office 3,355,019
Patented Nov. 28, 1967

3,355,019
EDUCTOR CONTROL IN SEWAGE TREATMENT PLANT
Ryan D. Mitchell, Thomasville, Ga., assignor to Davco Manufacturing Corporation, Thomasville, Ga., a corporation of Georgia
Filed Nov. 3, 1965, Ser. No. 506,152
4 Claims. (Cl. 210—104)

This invention relates to aerobic sewage treatment installations of the type in which sewage is pumped from a collection zone to a sewage treatment zone where aerating equipment diffuses compressed air into the sewage. In particular, the invention relates to an installation having air lift equipment for pumping the sewage from the collection zone to the treatment zone and to the automatic control of the air lift equipment and the aerating equipment.

Aerobic processes for purifying sewage or other liquids containing organic waste material are based on wet burning chemical reactions carried out by aerating the sewage after an initial separation of solids. Activated sludge processes are a special form of aerobic purification in which the reactions are carried out in tanks by means of air diffusers which deliver large quantities of air to the bottom of the tanks. In this type of installation it is conventional to employ a pair of blowers, each being operated alternately with the other so that aeration may continue when one blower is shut down for maintenance or repair. It is also conventional to employ a sewage collection zone in the form of a concrete wet well or the like from which the sewage is pumped periodically to the treatment zone under the control of the sewage level in the well. Sewage flows to the well by gravity or is pumped into the well from another collection point.

According to the principles of the present invention the blower system for an aerobic treatment zone is employed as the pumping source for pumping sewage from the wet well or other sewage collection zone to the treatment zone thereby dispensing with the need for a separate pump motor. This advantage is accomplished, broadly, by employing an air lift as the sewage pumping means and connecting the air lift into a two-blower aeration system in a manner such that lifting air will be made available to the air lift when needed regardless of which of the two blowers is operating to supply air to the diffusers.

A further advantage of the present arrangement is that aeration of the sewage begins earlier in the system as a result of the action of the air lift. As is known in the art, an air lift operates to raise liquids from a lower elevation to a higher elevation by means of air discharged in the form of many small bubbles into an upright casing below the liquid level. The mixtures of bubbles and liquid, having a lesser density than the liquid alone, tends to move upwardly in the casing and thereby raises some of the liquid in the casing.

A more specific feature of the invention is a valve and conduit arrangement and a control system for the blowers and air lift which is simple in construction and effective in operation. As already mentioned, only one of two blowers is employed at any one time for aerating purposes, the other blower remaining in a standby condition. While it is possible to employ the standby blower as the source of air for the air lift, regardless of which blower happens to be in standby condition, it is preferred to employ a special valve and control arrangement which achieves the desired air flows with a fewer number of valves and a simpler control system. In the preferred construction the outlet of the first blower is connectable to either the treatment plant or the air lift, and the outlet of the second blower is in continuous communication with the treatment plant. When the first blower is operating to deliver air to the treatment plant, a pump-down signal received from the sewage well changes the connection of that blower to deliver air to the air lift and at the same time turns on the second blower for deaerating purposes. When the liquid level in the sewage collection well falls to a predetermined level, the first blower again takes over the aerating function, and the second pump ceases operation. When a pump-down signal is received at a time when the second blower is aerating, the first blower starts operating to deliver air to the air lift, and the second blower continues to aerate. After the liquid level in the well has been pumped down, the first blower turns off again.

In the preferred construction the above-described air flow paths are affected by a simple and economical arrangement which includes a two-branch outlet line for the first blower and a control valve in each branch. One of the branches connects with the air lift, and the other connects with the sewage treatment plant. The outlet of the second blower is connected directly to the treatment zone. An electric control system is provided which alternates operation of the blowers for continuous aeration of the sewage in the plant and which at the same time is responsive to pump-on and pump-off signals from the sewage collection well to open and close the control valves and to start and stop the blowers in the desired manner.

Figure 2:
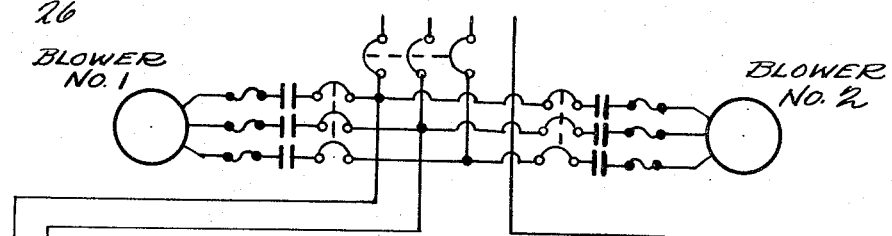
Figure 2:
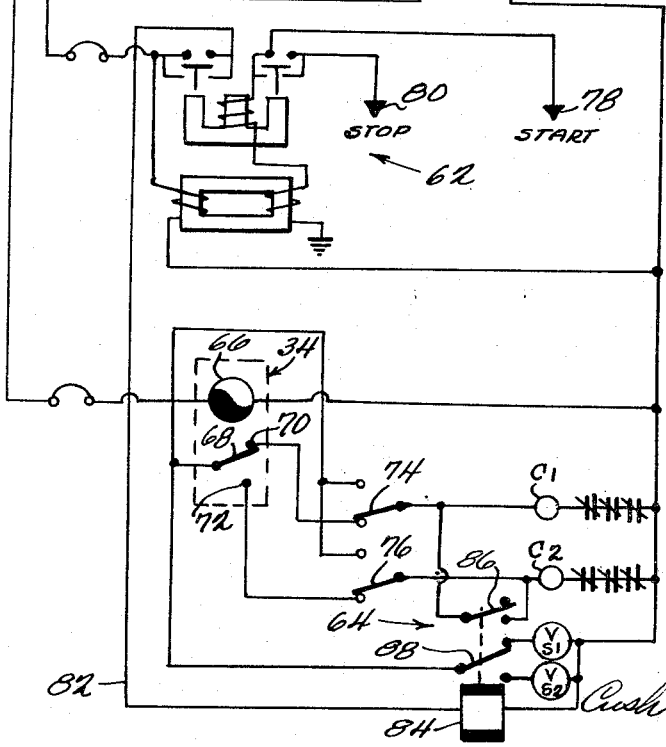

The invention will be further understood from the following detailed description taken with the drawing in which:

FIGURE 1 is a schematic elevational view, partly in section, of a sewage treatment installation; and FIGURE 2 is a simplified electrical diagram illustrating the control system for the installation of FIGURE 1.

Referring to FIGURE 1 there is shown schematically an aerobic sewage treatment installation which includes a sewage collection zone, illustrated as a below ground, cylindrical concrete wet well 10, and a sewage treatment zone 12. The treatment zone 12 is of conventional construction and includes various aerating tanks containing air diffusers, settling tanks, piping and the like for intimately contacting the sewage with large quantities of air and for separating solids which precipitate during the process. As is known in the art, a plant of this type operates by passing the sewage, after an initial solids removal step, into long narrow aeration tanks provided with air diffusers at the bottom. As the sewage passes through the tanks the air aids in the formation of floating colonies of saprophytic bacteria and protozoa. These organisms together with additional air produce various bioprecipitation, adsorption and wet burning reactions which remove the organic material from suspension or solution and create biologically active sludge. The sludge is permitted to settle and a portion is recycled to the incoming sewage, the remainder being discharged and ultimately disposed of as by drying for fertilizer, by incineration, or by digestion. The equipment for carrying out these operations form no part of the present invention and for simplicity of illustration the aeration equipment is shown schematically as tank 14 and diffusers 16. The excess sludge may be considered as leaving through an outlet 18 and the purified effluent as leaving through an outlet 20.

According to one feature of the present invention the sewage collection well 10 is provided with an air lift 22 for pumping sewage from the well to the aeration tank 14, the air lift being connected to receive pumping air from the air supply for the tanks 14 so that a separate pump motor is not required. As shown, the air lift 22 includes a vertical eductor casing 24 having an open lower end dipping into the raw sewage 26 which has drained into the well 10 through a line 28. An air supply pipe 30 is connected to the casing 24 a short distance above the open end of the latter for delivering air into the casing 24 under sufficient pressure to overcome the static head of the sewage 26 in the tank 10.

Air entering the casing 24 through the supply pipe 30 forms a multitude of bubbles which reduces the density of a portion of the liquid and causes it to rise thereby displacing some of the sewage in the upper part of the casing 24 into a pipe 32 leading to the aeration tank 14. The instant that part of the rising sewage is discharged, the weight of the sewage in the casing 24 is decreased and the air below will expand, thus reducing the pressure on the sewage in the casing 24 below the supply pipe 30. The weight of the sewage in the well 10 outside the casing 24 in turn forces sewage into the casing 24 momentarily stopping the flow of air. The pressure in the supply pipe 30 adjusts itself and forces air into the sewage thus starting the process again. This action is repeated until the casing 24 above the air supply pipe 30 is filled with alternate bodies of air and sewage, the combined density of which is lighter than the density of the sewage in the well 10 so that a constant flow of sewage is maintained so long as air is supplied to the air supply pipe 30. The precise construction of the air lift 22 is not significant, and any of the known designs of this type of equipment may be employed.

Referring now to the connection of the air supply pipe 30 to the air supply system for the aeration tank 14 it will be seen that air is supplied by two blowers, No. 1 and No. 2. A time control such as a time clock 34 operates the blowers alternately for predetermined lengths of time. Each of the blowers can be placed in communication with a main aerating pipe 36 which leads to a manifold pipe 38 above the tank 14. Each of the air diffusers 16 is connected to the manifold pipe 38 by a separate supply pipe 40 which extends downwardly into the tank 14.

The outlet of blower No. 2 connects directly with the main aerating pipe 36 through a line 42, and the outlet of blower No. 1 is provided with a line 44 which divides into two branches 46 and 48. The branch 46 connects with the air lift supply pipe 30 through a first solenoid-operated control valve S1. The branch 48 connects with the main aerating pipe 36 through a second solenoid-operated control valve S2. The blower outlet lines 42 and 44 contain check valves 54 and 55, respectively which permit air flow only in a direction away from the blowers. In addition, the line 42 contains a normally open gate valve 56, and a normally closed gate valve 58 is contained in a line 60 which interconnects the blower outlet lines 42 and 44. The valves 56 and 58 are provided for maintenance purposes and are not required for operation of the system.

A control system for the blowers and for the valves S1 and S2 is illustrated schematically in FIGURE 1 as including the time clock 34 and a control panel 61. The dashed lines indicate electrical control functions which are described below.

Referring to FIGURE 2 there is shown in detail a control circuit for operating the blowers and the air control valves S1 and S2 automatically in response to high and low sewage levels in the well 10. Broadly, the circuit includes the time clock 34, a liquid level responsive device 62 associated with the well 10 and an automatic switch arrangement 64 which determines the energization of the blower motors and the valves S1 and S2. At the top of FIGURE 2 it will be seen that electric current is supplied to the circuit by a 4 wire service. The time clock 34 is shown in simplified form as including a continuously operating timing motor 66 and a selector switch element 68 which is engageable with either of two contacts 70 and 72. As shown the switch element 68 is in engagement with the contact 70 with the result that a starter coil C1 for blower No. 1 is energized. At at subsequent time the timing motor 66 will cause the switch element 68 to move into engagement with the contact 72 thereby deenergizing C1 and energizing a starter coil C2 for blower No. 2 The contacts 70 and 72 connect with the coils C1 and C2 through manual switch elements 74 and 76 which have three positions. In the position shown the switch elements 74 and 76 transmit current in accordance with the operation of the time clock 34. Manually raising the switch elements 74 and 76 to a center position prevents energization of the blowers, and manually raising them to their highest position permits blower operation independently of the time clock 34.

The liquid level responsive device 62 may be of a conventional construction which includes a high level electrode 78 and a low level electrode 80 arranged in vertically spaced apart relationship in the well 10. When sewage in the well 10 rises to the level of the electrode 78, the device 62 transmits a pump-on signal through a control line 82 to the switch arrangement 64. When sewage drops to the level of the electrode 80, a pump-off signal is transmitted through the line 82 to the switch arrangement 64. The latter includes a relay 84 which simultaneously controls the position of a blower control switch 86 and a valve control switch 88. The motor control switch 86 is permanently connected to a line containing the starter coil C1 and is movable between upper and lower contacts for the purpose of turning the standby blower on and off. The valve control switch 88 is permanently connected to the current supply and is movable between upper and lower contacts for the purpose of controlling the air control valves S1 and S2. Since the time clock 34 directs current alternately to one blower and then to the other, the effect of a given movement of the motor control switch 86 depends on which blower is operating at the time of movement.

Conveniently, the elements 84, 86 and 88 of the switch arrangement 64 together with the elements 74 and 76 will be mounted in the control panel 61 (FIGURE 1), and suitable electrical conduits, illustrated by the dashed lines in FIGURE 1, will extend between the panel and the blowers, valves S1 and S2 and the liquid level responsive device 62.

FIGURE 2 illustrates the position which the various elements have when blower No. 1 is operating to aerate sewage in the tank 14, and when blower No. 2 is off and when the level of sewage 26 in the well 10 is rising. Under these conditions the air control valve S1 is closed and the air control valve S2 is open with the result that air flows from blower No. 1 through the line 44, through the branch 48 and into the main aerating pipe 36. The check valve 54 in line 42 prevents flow of air into blower No. 2 in a reverse direction. More specifically, the starting coil of blower No. 1 is in an energized condition as a result of the engagement of the clock-controlled switch element 68 with the contact 70. The valve S1 is in an energized condition as a result of the position of the relay 84 which engages the switch element 88 with its upper contact. No current flows to the starting coil C2 of blower No. 2 because of the positions of the switch element 68 and of the switch element 86. Similarly, no current flows to the valve S2 because of the position of the switch element 88.

When the sewage 26 in the well 10 rises to the level of the electrode 78, two changes are effected simultaneously by the control circuit of FIGURE 2. First, the air flow from blower No. 1 is switched from the main aerating pipe 36 to the air lift supply pipe 46 and, second, blower No. 2 is turned on to supply air to the main aerating pipe 36. Both changes are effected by the signal transmitted through the control line 82 to the relay 84. The latter shifts the switch levers 86 and 88 away from their upper contacts and into engagement with their lower contacts. Since the line to the coil C1 remains energized under the control of the time clock 34, movement of the switch element 86 completes a circuit to the coil C2 thereby starting blower No. 2. The simultaneous movement of the switch element 88 deenergizes the valve S1 causing it to open and energizes the valve S2 causing it to close. Thus, air flow from blower No. 1 now passes through line 44, branch 48 and into the air supply pipe 30 for the air lift 22. Air flow from blower No. 2 passes through the line 42 directly into the main aerating pipe 32.

When the sewage 26 in the well 10 drops to the level of the electrode 80, another signal is transmitted through the control line 82 to the relay 84. The latter then returns the switch elements 86 and 88 to the positions shown in FIGURE 2 thereby turning off blower No. 2, closing valve S1 and opening valve S2. This cuts off the air supply to the air lift and again directs air from blower No. 1 to the diffusers 16.

As the time clock 34 continues to operate, blower No. 1 will eventually be placed in a standby condition and blower No. 2 will be started at the same time. This will occur when the timing motor 66 causes the switch element 68 to move away from contact 70 into engagement with contact 72 thereby energizing coil C2 through the closed switch element 76. Now air will pass through the line 42 into the main aerating pipe 36. Valve S1 is in a closed position thereby preventing air from entering the air lift supply pipe 30. The check valve 55 prevents air flow into blower No. 1 in a reverse direction. If a high sewage level in the well 10 occurs, the level responsive device 62 and the relay 84 will again move the switch elements 86 and 88 into engagement with their lower contacts, but the effect of this movement will be different from the effect in the previously described operation. In this instance downward movement of the switch element 86 will start blower No. 1 by completing a circuit between the starting coil C1 and the already energized line containing C2. Also in this instance, the valves S1 and S2 will produce a different result even though the position of each valve is reversed in the same manner as before. Thus, when valve S2 closes, air from blower No. 2 continues to flow directly into the main aerating pipe 36. When valve S1 opens, air from the just-started blower No. 1 passes into the air lift supply pipe 30. When the sewage 26 drops to the level of the electrode 80, the switch elements 86 and 88 return to their up positions thereby turning off blower No. 1, closing valve S1 and opening valve S2.

In summarizing the automatic operation of the system it may be pointed out that blower No. 2 always supplies aerating air whereas blower No. 1 supplies either aerating air or pumping air depending on which blower is aerating at the time when sewage rises to the level of the electrode 78. Stated somewhat more specifically, when blower No. 1 is aerating and blower No. 2 is off, a rise in sewage level in the tank 10 turns on blower No. 2 to supply aerating air and reroutes the output of blower No. 1 to the air lift 22. When blower No. 2 is aerating and blower No. 1 is off, a rise in sewage level in the tank 10 turns on blower No. 1 to supply air to the air lift 22 but has no effect on the air flow from blower No. 2.

It will thus be seen that the present invention provides a simple and effective system for air lifting sewage to a treatment plant under automatic control. The embodiment which has been described and illustrated is exemplary of the principles of the invention and it is not intended that the disclosed details be limiting except as they appear in the appended claims.

What is claimed is:

1. An aerobic sewage treatment installation comprising: sewage treating means for aerating sewage; sewage collection means for collecting sewage prior to its treatment in said treating means; air lift means including an eductor pipe having one end dipping into sewage in said collection means and its other end connected to deliver sewage to said treating means, said air lift means further including an air supply pipe connected to deliver air into said eductor pipe below the level of sewage in said collection means; first and second blowers for supplying compressed air through separate outlets; valve and conduit means connecting the outlet of said first blower with said treating means and with said air supply pipe, said connecting means including a normally closed first valve and a conduit extending therefrom to said air supply pipe, said connecting means further including a normally open second valve and a conduit extending therefrom to said treating means; conduit means connecting the outlet of said second blower with said treating means, said last-named conduit means being separate from the conduits associated with said first and second valves whereby when only one blower is operated air therefrom is passed to said treating means and whereby when both blowers are operated and when the positions of said first and second valves are reversed, air from said first blower passes to said air supply pipe and air from said second blower passes to said treating means.

2. Apparatus as in claim 1 including automatic control means for reversing the positions of said first and second valves, said control means including a liquid level sensitive device associated with said sewage collection means for generating a first signal upon a rise in sewage level to a predetermined high level and for generating a second signal upon a drop in sewage level to a predetermined low level, said control means being operative upon occurrence of said first signal to open said first valve and to close said second valve and operative upon occurrence of said second signal to close said first valve and to open said second valve.

3. Apparatus as in claim 2 including time responsive control means for operating said first and second blowers in sequence for predetermined lengths of time and further including blower control means responsive to said first and second signals to turn on and off, respectively, whichever blower is not being operated under the control of said time responsive means whereby when the liquid level in said collection means rises to said predetermined high level both blowers will operate, and when the liquid level drops to said predetermined low level one of said blowers will turn off while the automatic operation of said valves assures that air will be continuously passed to said treating means.

4. An aerobic sewage treatment installation comprising a sewage collection zone; a sewage treatment zone; a pair of blowers each having an air outlet; an air lift associated with said collection zone for removing sewage therefrom, said air lift including an eductor pipe dipping into the sewage in said collection zone and an air supply pipe having one end connected to said eductor pipe near the lower end of the latter; means for generating a first signal when liquid in said collection zone rises to a predetermined level and a second signal when liquid in said collection zone falls to a predetermined level; valve and conduit means connecting the air outlets of said blowers with the other end of said eductor air supply pipe and with said treatment zone; time controlled means associated with said blowers for operating said blowers alternately for predetermined lengths of time; and control means associated with said blowers and with said valve and conduit means operative upon occurrence of said first signal for turning on whichever blower is not running and for simultaneously conducting air from the outlet of one of said blowers to said eductor air supply pipe and from the outlet of the other blower to said treatment zone and operative upon occurrence of said second signal for turning off one of said blowers while maintaining air flow to said treatment zone.

References Cited

UNITED STATES PATENTS

| | | | |
|---|---|---|---|
| 1,282,587 | 10/1918 | Jones | 210—258 X |
| 2,897,149 | 7/1959 | Griffith | 210—138 X |

REUBEN FRIEDMAN, *Primary Examiner.*

D. M. RIESS, *Assistant Examiner.*